United States Patent [19]
Chen et al.

[11] Patent Number: 6,057,620
[45] Date of Patent: May 2, 2000

[54] GEOMETRICAL STRUCTURE CONFIGURATION OF MAGLEV FORCES IN A MAGLEV ROTATIONAL BEARING APPARATUS

[75] Inventors: Fong-Zhi Chen, Nan Tour Shian; Rong-Yuan Jou, Taichung; Hong-Ping Cheng; Yu-Wen Chang, both of Hsinchu; Jin-Shyang Lin, Jang Hauh Shian, all of Taiwan

[73] Assignees: Precision Instrument Development Center; National Science Council of Republic of China, both of Hsinchu, Taiwan

[21] Appl. No.: 09/301,008

[22] Filed: Apr. 28, 1999

[51] Int. Cl.[7] .................................................. H02K 7/09
[52] U.S. Cl. .......................................... 310/90.5; 310/90.5
[58] Field of Search ............................................. 310/90.5

[56] References Cited

U.S. PATENT DOCUMENTS

| | | | |
|---|---|---|---|
| 3,791,704 | 2/1974 | Perper | 310/90.5 |
| 4,037,886 | 7/1977 | Boden et al. | 310/90.5 |
| 5,142,175 | 8/1992 | Watanabe | 310/90.5 |
| 5,155,402 | 10/1992 | Bichler | 310/90.5 |
| 5,256,638 | 10/1993 | Weinberger et al. | 310/90.5 |
| 5,319,275 | 6/1994 | Tozoni | 310/90.5 |
| 5,481,146 | 1/1996 | Davey | 310/90.5 |
| 5,508,573 | 4/1996 | Andrews et al. | 310/90.5 |
| 5,729,066 | 3/1998 | Soong et al. | 310/90.5 |

FOREIGN PATENT DOCUMENTS

| | | |
|---|---|---|
| 209303 | 7/1992 | Taiwan . |

*Primary Examiner*—Nestor Ramirez
*Assistant Examiner*—Thanh Lam
*Attorney, Agent, or Firm*—Bacon & Thomas, PLLC

[57] ABSTRACT

This invention provides a geometrical structure configuration of maglev forces in a maglev rotational bearing apparatus. The bearing apparatus uses the magnetic forces as the suspension support for the rotational shaft, and utilizes a radial maglev support module to provide two maglev constraint forces perpendicular to and crossing on the axis of rotating shaft and an axial maglev support module to provide three maglev constraint forces parallel to the axis but non-coplanar. From the viewpoint of kinematical geometry, this machine has five linearly independent constraint forces so that the main axis is allowed to be suspended without contact and friction with static elements, and the suspension force in axial direction is better than currently available maglev bearings. The rotational shaft can be driven by a motor to perform high-speed rotational motion with noises free and vibrations free. This technique can be applied to high-speed rotational machines such as turbo molecular vacuum pumps, the spindle of high-speed machine tools, inertial gyroscopes, etc.

9 Claims, 4 Drawing Sheets

GEOMETRICAL STRUCTURE CONFIGURATION OF MAGLEV FORCES IN A MAGLEV ROTATIONAL BEARING APPARATUS

BACKGROUND OF THE INVENTION

1. Field of the Invention

This invention relates to a geometric structure configuration of maglev forces in maglev rotational bearings and, in particular, to a geometric structure configuration of maglev forces with five linearly independent constraint forces, which make the rotating shaft suspended without getting into touch and friction with the static elements and whose supportive effect in axial stops is better than conventional bearings in lowering the noise and vibration as applied to the maglev rotation bearing apparatus with high-speed rotating motion.

2. Description of the Prior Art

A maglev bearing, an integration of machines, electronics, and control technology, suspends the rotating elements by the magnetic forces which suspend rotating elements and control the position of the rotating shaft It has such features as no contact, frictionlessness, no lubricant mechanism necessary and controllable system vibration, etc. According to the source of the maglev forces, there are superconducting magnets, permanent magnets and electromagnets. The maglev forces for suspending rotating elements can be either attractive or repulsive; however, since repulsive forces are not easy to control, attractive forces are commonly used as the source for suspension. According to the controlling methods of maglev forces, the maglev bearings can be classified as active, passive or hybrid types. The active maglev bearing system is a servo controlling system composed of an electro-maglev actuator, a position sensor, a controller, and a linear power amplifier. The position sensor senses the position of the sensor target on the rotating shaft, converts the size of the clearance to voltage signals and feeds it back to the servo controller. The controller then outputs controlling signals to the power amplifier, which may transform the voltage signal to a driving current to the electromagnet so as to control the position of the rotating shaft.

A conventional maglev bearing apparatus, such as R.O.C. Pat. No. 209303 (referred as the reference thereafter), mainly comprises: a maglev bearing, comprising a static element, and a rotating element, whereas one of the elements at least contains part of the other element, and one of the elements has a ring-like first magnetic element wrapping around the other element while part of which provides a second magnetic element, which usually has a circular surface and a substantial magnetic monopole in the surrounding area so that both elements keep floating on each other, and the other element further comprises a nonmagnetic cylinder sitting around the surface. The main drawbacks in its structure is that said maglev bearing apparatus utilizes permanent magnets in configuring its magnetic monopoles whose magnetic force is repulsive, which in turn means that said maglev bearing is of repulsive type. As mentioned earlier, repulsive forces are difficult to control and therefore the design of said maglev bearing is not ideal.

Moreover, other related designs of maglev bearings make use of two radial maglev suspending modules, each with two coplanar maglev constraint forces that are perpendicular to the axis and cross right at the axis, and an axial maglev suspension module, providing a constraint force along the axis. Thus, there are totally five linearly independent constraint forces in such a maglev bearing system so that rotating machines can freely rotate around the axis with frictionness. Yet other designs have suspension modules on both ends of the main axis, each with three constraint forces crossing at the end points of the main axis. However, these six constraints are linearly dependent, and only five of them are linearly independent, which can still make the 2i rotating machines freely rotating around the axis with no contact. As mentioned before, the radial maglev supporting design of the geometric configuration of said maglev forces is weak and does not take into account the application problem when the shaft suffers from larger axial load. Furthermore, the adjustment of the distance between magnetic poles and the main axis is to get the best balance against gyroscopic coupling especially in an over-hung rotor; nonetheless, the geometric configuration of current designs do not provide easy adjustment and are not ideal. Thus conventional technology has many disadvantages and needs improvement. The present invention overcomes every drawback inherent in these designs and provides a better layout of the geometry of maglev forces.

SUMMARY OF THE INVENTION

The present invention provides a geometrical structure configuration of maglev forces in a maglev rotational bearing apparatus with extremely good applicability to high-speed rotating machines, such as turbo molecular vacuum pumps, the spindle of high-speed machine tools and inertial gyroscopes.

Furthermore, the invention provides a geometrical structure configuration of maglev forces in a maglev rotational bearing apparatus with firmer suspension in the axial direction.

Yet this invention provides a geometrical structure configuration of maglev forces in a maglev rotational bearing apparatus with a better suspension balance that is applicable to rotational machines with larger axial load.

Moreover, the instant invention provides a geometrical structure configuration of maglev forces in a maglev rotational bearing apparatus with easy adjustment on the distance between axial magnetic poles and the main axis to get a better effect in balance against gyroscopic coupling.

A geometrical structure configuration of maglev forces in a maglev rotational bearing apparatus with the above features according to the present invention comprises.

a radial maglev suspension module wherein said radial suspension module provides two constraints in the degrees of freedom and said two electromagnetic constraint forces are coplanar and perpendicular to said main axis and cross at one point; and in an axial maglev suspension module providing three constraints in the degrees of freedoms wherein said three magnetic constraint forces are parallel to the main axis and not coplanar.

The degrees of freedom of a rigid body is six in the three-dimensional space. The maglev actuator provides partial constraints by magnetic forces and leaves other unconstrained degrees of freedom in controllable input/output movements or controllable by motion-controls For a rotational machine its degrees of motion is one and thus needs five linearly independent maglev constraint forces to allow the rotational machines to freely rotate around the main axis or to be controlled by a motor.

BRIEF DESCRIPTION OF THE DRAWINGS

The drawings disclose an illustrative embodiment of the present invention which serves to exemplify the various advantages and objects hereof and are as follows.

DETAILED DESCRIPTION OF THE PREFERRED EMBODIMENT

Figure 1:
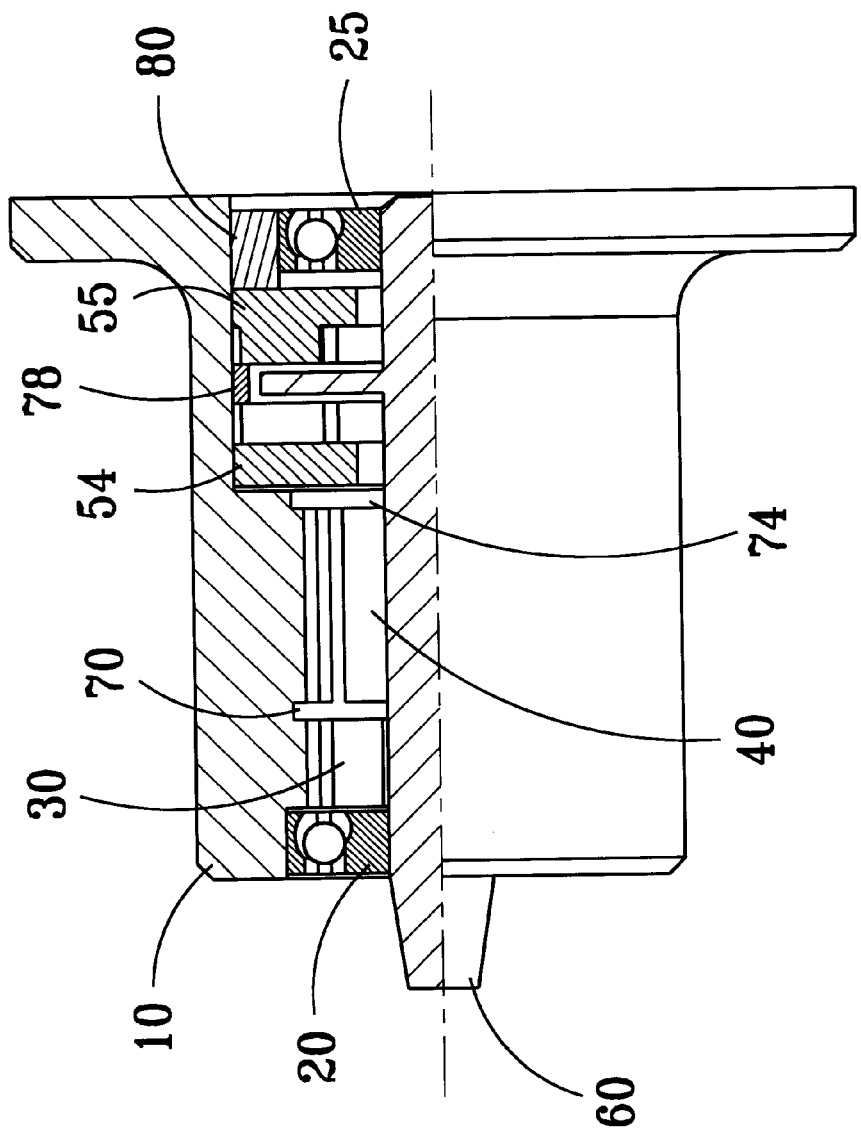
FIG. 1 is a composition diagram showing the geometrical structure configuration of maglev forces in a maglev rotational bearing apparatus according to the present invention.
Figure 2:
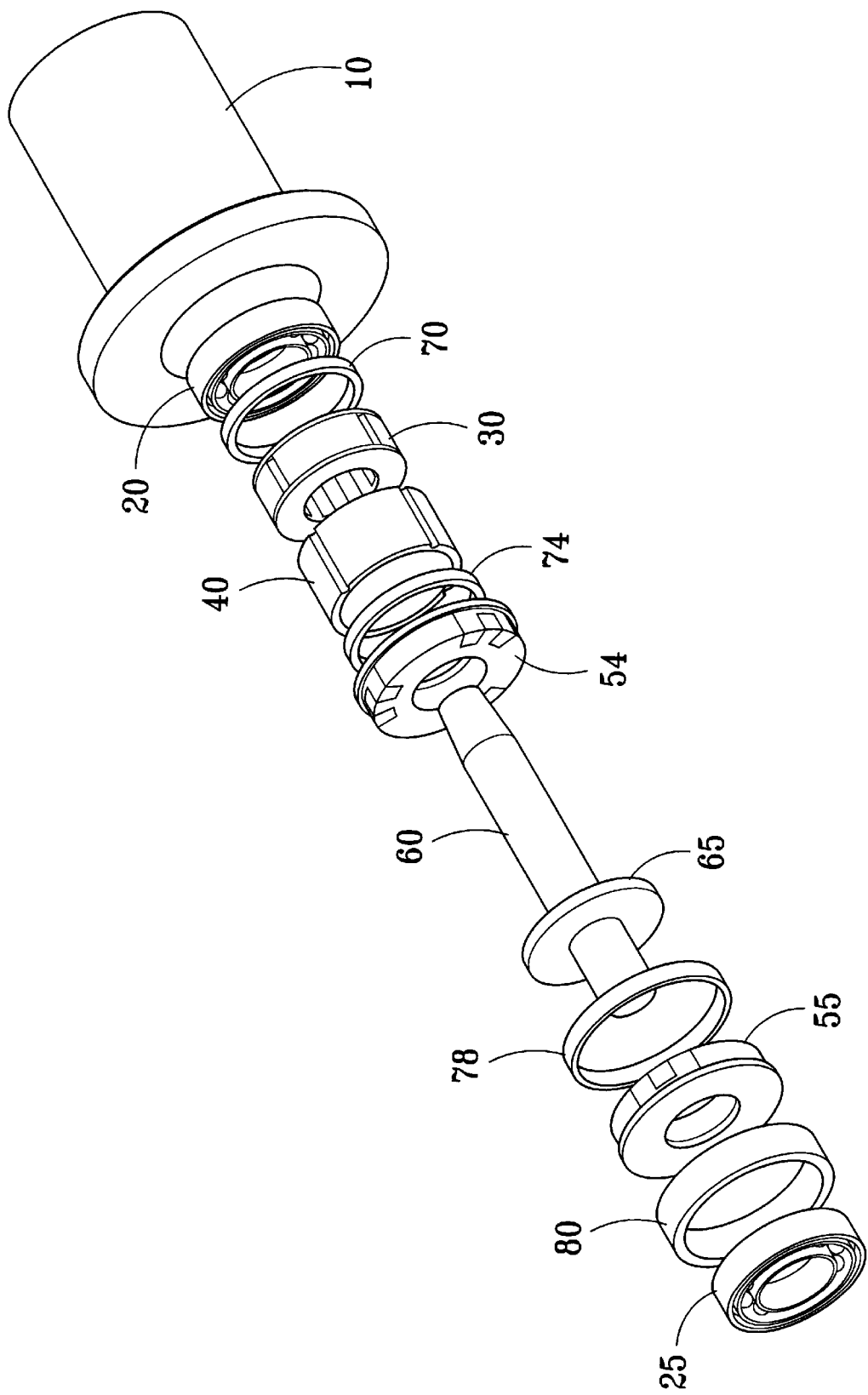
FIG. 2 is a three dimensional perspective of the geometrical structure configuration of maglev forces in a maglev rotational bearing apparatus according to the present invention.

Please refer to FIG. 1 and 2, the geometrical structure configuration of maglev forces in a maglev rotational bearing apparatus provided by the instant invention comprises: a body 10, auxiliary ball bearings 20, 25, a radial maglev suspension module 30, motor armature 40, electromagnets 54, 55 of the axial maglev suspension module, a spindle shaft 60 haring a main axis, spacing rings 70, 74, 78, an auxiliary bearing fixing ring 80, etc. Both ends of the shaft 60 have auxiliary ball bearings 20, 25, and on the left hand side of the circular disk 65 of the shaft 60 is a spacing ring 78. The electromagnet 55 of the axial maglev suspension module is to the left of the spacing ring 78. The auxiliary bearing fixing ring 80 is placed between the electromagnet 55 of the axial maglev suspension module and the auxiliary ball bearing 25. To the right of the circular disk 65 of the shaft 60 is equipped with the electromagnet 54 of the axial maglev suspension module and to the right of which is the motor armature 40. The spacing ring 74 is switched between the electromagnet 54 of the axial maglev suspension module and the motor armature 40. The radial maglev suspension module 30 is connected to the right of the motor armature 40. The spacing ring 70 is placed between the radial maglev suspension module 30 and the auxiliary ball bearings 20. All the above elements are contained in the body 10.

Figure 3:
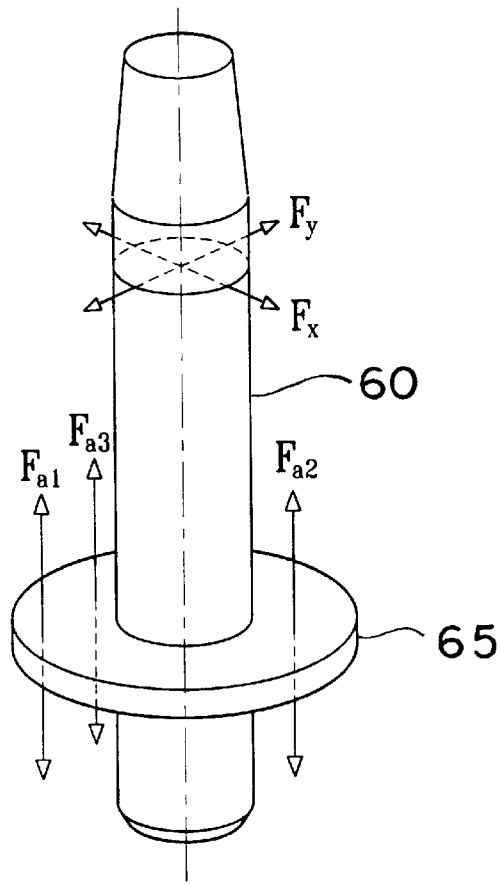
FIG. 3 shows the geometrical configuration of maglev constraint forces in the geometrical structure configuration of maglev forces in a maglev rotational bearing apparatus according to the present invention.
Figure 4:
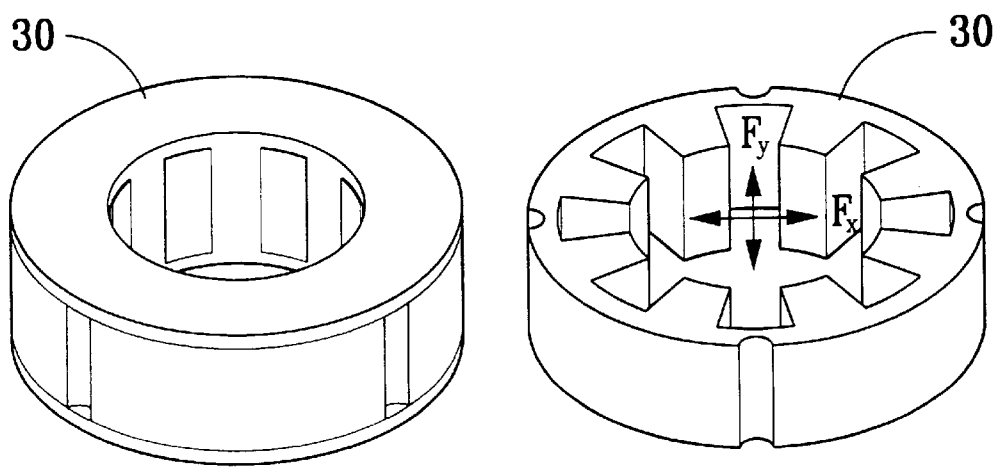
FIG. 4 shows a radial maglev suspension module in the geometrical structure configuration of maglev forces in a maglev rotational bearing apparatus according to the present invention wherein the radial maglev suspension module is a electromagnetic octet with two constraining forces perpendicular to the main axis and cross at a point on the axis.
Figure 5:
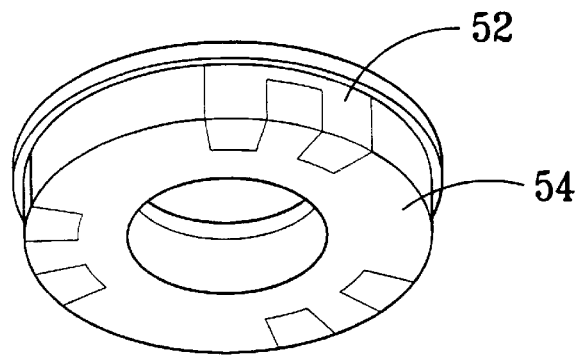
FIG. 5 shows an axial maglev suspension module in the geometrical structure contiguration of maglev forces in a maglev rotational bearing apparatus according to the present invention, wherein the axial maglev suspension module has two electromagnetic hexads and a circular disk connecting to the main axis with the three constraint forces parallel to the main axis but not coplanar.
Figure 5:
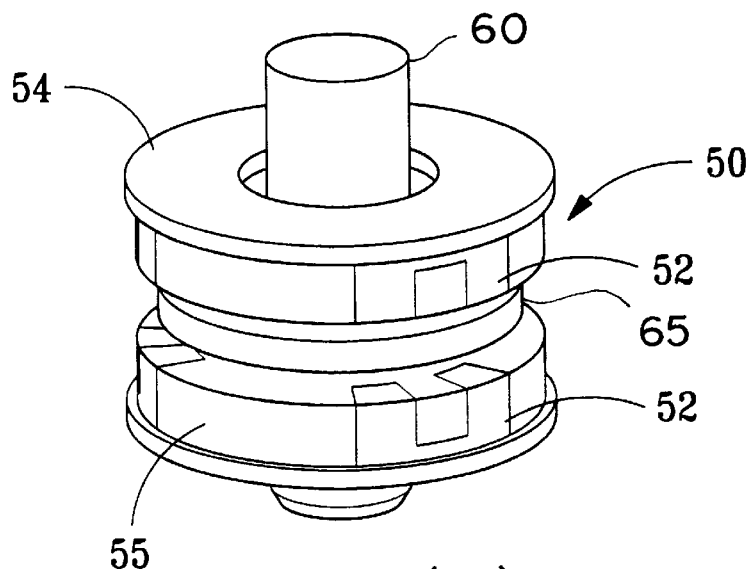
Figure 6:
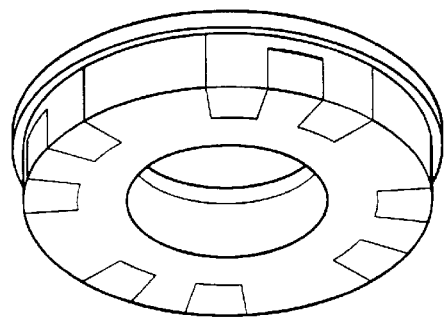
FIG. 6 shows an equivalent design of an axial maglev support module in the geometrical structure is configuration of maglev forces in a maglev rotational bearing apparatus according to the present invention

This invention provides another geometrical configuration of maglev constraint forces from the viewpoint of the geometry of mechanical kinematics, and modularizes the maglev bearing structure. This structure is mainly composed of an axial maglev suspension module 50 and a radial maglev suspension 30. The geometrical configuration of constraint forces are shown in FIG. 3, wherein the shaft 60 and the circular disk 65 connecting to the shaft 60 are objects to be attracted and should be manufactured by materials with better magenetic permeability or be improved in in maglev efficiency near the surface layer of the magnetic poles. The radial maglev suspension 30, which is similar to conventional radial maglev bearing suspension as shown in FIG. 4, provides the degrees of freedom two constraints that are linearly independent, perpendicular to the shaft 60 and cross at one point. The axial maglev suspension module 50 as shown in FIG. 5(B) consists of electromagnets 54, 55 of two hexads 52 in the upper and lower positions and the circular disk 65 and a position sensor placed on an electromagnet and a sensor target on the circular disk; connecting to the shaft 60, providing the degrees of freedom three constraints that are parallel to the axis of shaft 60 but non-coplanar. The position sensor is placed on the electromagnet to sense the position of the shaft, convert the gap to a voltage signal, and feedback to the servo controller which automatically controls the position of the shaft. If electromagnets 54, 55 are used as the sources of magnetic forces, the iron should be materials with better magnetic permeability to increase the maglev efficiency. The axial maglev suspension module 50 and the radial maglev suspension 30 according to the present invention totally have five linearly independent electromagnetic constraint forces as the maglev supports and allow objects to rotate around the axis of shaft 60. The spacing rings 70, 74, 78 are nonmagnetic materials. Please refer to FIG. 6, if one changes the design of the axial maglev suspension module 50 to be four maglev supporting forces parallel to the axis of shaft 60, the manipulation of dynamical calculation can be simplified. Nevertheless, these four maglev supporting forces are linearly dependent and only eliminate three degrees of freedom. Therefore it is classified to be the same as the module in FIG. 3 in kinematical geometry, which is a problem with redundant constraint forces when solving the dynamical equations for the control.

This machine consisting of two maglev suspension modules, with one being the radial maglev support module 30 and the other the axial maglev support imnodule 50, is different from the current maglev bearing machinery composed of two radial magiev support modules and one axial inaglev module in their geometrical configurations. This gives less limitation for the current invention when combined with other mechanical elements than the conventional ones. For example, in the applications where the main axis of the rotational machine is larger in the diameter to and length, or the shaft has a larger rotational inertia, one may utilize the mechanical configuration of the instant invention to adjust the distance between the three non-coplanar constraint forces in the axial module and the axis of shaft to obtain a better balance against gyroscopic. Besides, the axial suspension force in this machine is better than current designs. Furthermore, this invention has one less radial module than usual maglev bearings. The reliability can be relatively increased while the cost lowers as the number of mechanical elements decreases.

This machinery make use of inaglev suspension and thus allow rotating machines to freely rotate around the main axis without friction and lubricant, which can be implemented in high-speed pumps, the spindle of high-speed machine tools and inertial gyroscopes to decreases frictional dissipation, noises and vibrations Since there is no need for lubrication when this machine operates, there will be no pollution of particles produced due to friction or the lubricant, as in an environment requiring good vacuum and cleanness.

The geometrical structure configuration of maglev forces in a maglev rotational bearing apparatus pursuant to the present invention, when compared with aforementioned reference and other known arts, has the following advantages: the maglev bearing is a crucial element in high-speed rotational machines, turbo molecular vacuum pumps, etc.

This invention finds a new design from the discussion of the geometrical configuration of magnetic poles in maglev suspension bearings from kinematical geometry. Not only does this new design can levitate the shaft and permit a free rotation of the shaft by maglev in the same way as a conventional one does, but it has a superior axial suspension force than a conventional one, which gives a better balance support il rotational machines with larger axial load. In addition, the distance between the axial magnetic pole and the main axis can be adjusted under the consideration of the dynamics in the rotating mechanical gyroscope This invention has extremely good market potential in applications to high-speed rotational machines such as turbo molecular vacuum pumps, the spindle of high-speed machine tools and inertial gyroscopes.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A geometrical structure configuration of maglev forces in a maglev rotational bearing apparatus having a shaft with a main axis, which comprises:
   a radial maglev suspension module, wherein said radial suspension module provides two magnetic constraints in the degrees of freedom and said two magnetic constraints are coplanar and perpendicular to the main axis of said shaft and cross at one point;
   an axial maglev suspension module providing three magnetic constraints in the degrees of freedom, wherein said three magnetic constraints are parallel to the main axis and not coplanar; and
   said geometrical structure configuration includes five linearly independent maglev constraint forces arranged so that a rotational machine may freely rotate around the main axis of said shaft or may be controlled by a motor.

2. The geometrical structure configuration of maglev forces a maglev rotational bearing apparatus as claimed in claim 1, wherein said magnetic forces are attractive forces produced by the group consisting of permanent magnets, electromagnets, superconducting magnets and hybrids thereof.

3. The geometrical structure configuration of maglev forces in a maglev rotational bearing apparatus as claimed in claim 1, wherein attractors are a magnet in said axial module and a magnet in said radial module, wherein objects to be attracted are said shaft and a circular disk connected to said shaft.

4. The geometrical structure configuration of maglev forces in a maglev rotational bearing apparatus as claimed in claim 2, wherein objects to be attracted by said maglev forces and a surface close to poles of said magnets are made of materials of high magnetic permeability or lamination configured to decrease dissipation of magnetism.

5. The geometrical structure configuration of maglev forces in a maglev rotational bearing apparatus as claimed in claim 1, further comprising an attractor having an electromagnet composed of laminated silicate steel.

6. The geometrical structure configuration of maglev forces in a maglev rotational bearing apparatus as claimed in claim 1, wherein said axial maglev suspension module is supplied with three constraint forces parallel to said main axis but non-coplanar to each other by two electromagnetic hexads in the upper and lower positions, and said axial maglev suspension module comprises two magnets in the upper and lower positions, a position sensor placed on said electromagnet and a sensor target on said circular disk, wherein said position sensor converts the clearance between the magnetic pole and said sensor target to voltage signal, and combines with controllers of the three axes and the power amplifier to form a servo control system which automatically adjust the size of a gas gap.

7. The geometrical structure configuration of maglev forces in a maglev rotational bearing apparatus as claimed in claim 6, wherein said axial module is supported by maglev of three constraints and if the number of magnetic forces is greater than three, then the combination of axial maglev suspension forces parallel to said main axis but non-coplanar has three degrees of constraint.

8. The geometrical structure configuration of maglev forces in a maglev rotational bearing apparatus as claimed in claim 1, wherein said axial module is supported by maglev of three constraints and if the number of magnetic forces is greater than three, then the combination of axial maglev suspension forces parallel to said main axis but non-coplanar has three degrees of constraint.

9. The geometrical structure configuration of maglev forces in a maglev rotational bearing apparatus as claimed in claim 1, wherein said geometrical structure configuration and the functionality of the machinery are related to the efficiency, where stability in rotational machines with larger diameters and lengths can be adjusted by adjusting a distance between said main axis and axial maglev suspending forces.

* * * * *